Jan. 3, 1950     M. S. WRIGHT     2,493,279
CASSEROLE
Filed March 9, 1946
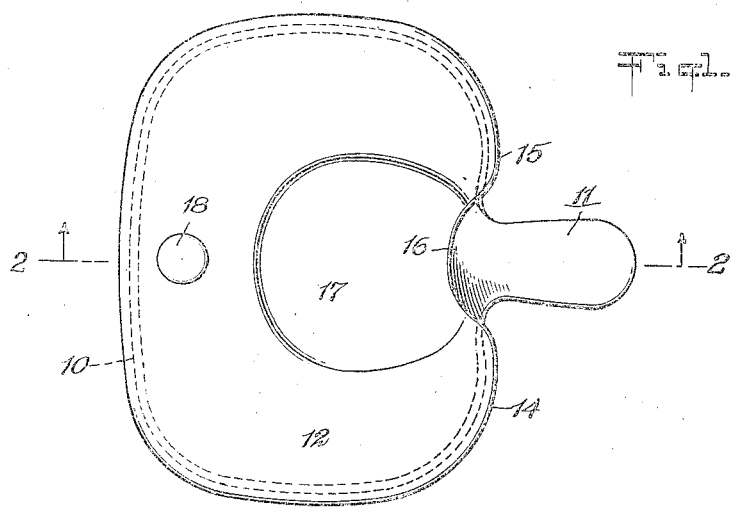
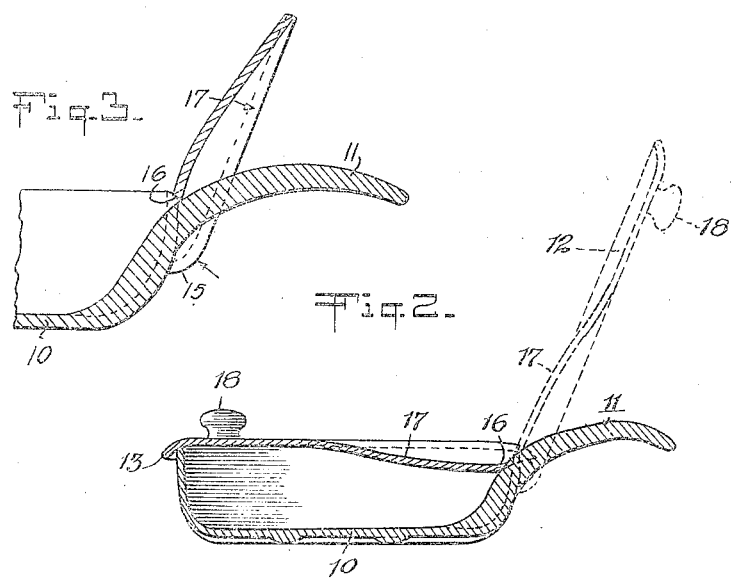
INVENTOR.
Mary S. Wright
BY
Munn, Liddy & Glaccum
Attorneys Patented Jan. 3, 1950

2,493,279

UNITED STATES PATENT OFFICE 2,493,279

CASEROLE

Mary S. Wright, New York, N. Y.

Application March 9, 1946, Serial No. 653,299

2 Claims. (Cl. 65—60)

1

This invention relates to new and useful improvements in dishes and has particular reference to casseroles of ceramic ware in which food is cooked and which is subjected to intense heat.

An object of the invention is to provide a casserole or dish with a cover which can be tilted to the open position without lifting it from the dish.

A further object is to provide a casserole or dish which can be readily made of materials which will not normally hold hinges, but which will have all the advantages of a hinged dish.

A further object is to provide a hingeless cover which may be left on the dish while on the table to keep the food hot and which can be opened without removing it from the dish while the food is being served therefrom.

A further object is to provide a simple, durable, efficient device made of only two parts mechanically disconnected which facilitates both ease of use and economy of manufacture.

A further object is to provide an attractive form of receptacle and disconnected cover therefor which are pleasing in appearance whether the cover is open or closed, and which is provided with simple rounded contours which greatly simplifies cleaning and washing and reduces danger of breakage.

Further and more specific objects, features and advantages will more clearly appear from a consideration of the specification hereinafter set forth especially when taken in connection with the accompanying drawings which illustrate a present preferred form which the invention may assume and which form part of the specification.

In brief and in the most general terms the invention relates to a receptacle which may be in the form of a dish or casserole having a body portion on which is adapted to rest a cover which is not mechanically connected therewith. The dish body portion has a rearwardly extending handle portion which acts as a stop element for the rear edge of the cover when lifted to a position slightly beyond the vertical and the rear edge of the cover is provided with one or more integral portions which extend beyond the rear edge of the body portion when the cover is flat and acts as limiting stop members when the cover is lifted to the above position by bearing against the rear wall of the body portion thereby limiting the distance beyond the vertical to which the cover may be moved.

The body portion is formed of one piece with the handle and the cover element with its lifting knob or handle is also made in one piece so that the entire device is only two pieces so formed

2 as to permit of the above action without employing hinges or other parts which rapidly deteriorate under high heat to which such devices may be subjected.

Of course it is not intended to limit this invention to mere dishes or casseroles since many conceivable receptacles may be formed with a separable cover which can be thus related to its body so as to be tilted to open position without removing it from the body. Such other articles may include most any cooking receptacle where a cover is used, serving utensils, sewing cases, small chests, cigarette boxes, industrial bins, and many others which may easily come to mind. These parts of course, depending upon the use to which they are put may be made of any desired material without affecting the nature and scope of the invention in any manner whatsoever.

The present preferred form of the invention is illustrated in the drawings of which, Fig. 1 is a plan view of the device with the cover lying flat thereon in closed position; and, Fig. 2 is a vertical cross section taken on the line 2—2 of Fig. 1.

Fig. 3 is a fragmentary cross-sectional view in section on the same line as Fig. 2 but showing the cover raised.

The form shown which is only one of many which may be used, is represented as a casserole of ceramic material. This device has a body portion 10 of suitable attractive shape and with a handle 11 which as shown slopes upwardly as it leaves the body portion and acts as a stop element.

The cover portion 12 is of similar material and in plan view is of the same shape as the body 10 except that along most of its periphery it extends slightly beyond the top edge of the body 10 as seen at 13. This extension beyond the top edge of the body also occurs at the rear of the cover 12 especially on each side of the handle 11. These rear over-extension portions are numbered 14 and 15. Between these portions 14 and 15 the rear edge of the cover is curved inwardly and downwardly as shown at 16 to form the rear edge of a portion of the cover which is depressed and numbered 17. This depression especially of the middle of the rear edge of the cover is so that when the cover is tilted up this rear edge will quickly lie against the adjacent sloping portion of the handle to limit the movement of the cover to a position just beyond the vertical as shown in dotted lines in Fig. 2.

Further limiting action which cooperates with the limiting action of cover edge 16 is the limiting action of the extensions or lips 14 and 15 which when the cover is tilted up will limit against the rear face of the body 10 as shown in Fig. 2 and thus insure the proper positioning of the cover in open position without the use of hinges or any other metallic elements thus enabling the cover to be opened without removing it from the dish but also enabling it to be removed instantly when desired.

The cover 12 is preferably provided with a knob 18 which however may just as well be an extending handle to facilitate the lifting of the cover from the dish 10.

The preferred form therefore is seen to have a cover with a rear edge which extends beyond the top of the body and is reversely curved and slightly depressed in front of the handle to permit the pivoting of the cover around this edge and the stopping of the cover by the rearwardly extending lips. The whole arrangement is one of smooth curves and shape giving a pleasing appearance without sharp corners which nevertheless achieves the simple practical and highly efficient results intended.

While the invention has been described in detail and with respect to a present preferred form thereof, it is not to be limited to such details and form since many changes and modifications may be made in the invention without departing from the spirit and scope of the invention in its broadest aspects. Hence, it is desired to cover any and all forms and modifications of the invention which may come within the language or scope of any one or more of the appended claims.

What I claim as my invention, is:

1. A receptacle having a body portion with a rearwardly and upwardly sloping handle, a cover having a rear edge which on both sides of the handle extends beyond the top of the body to act as limit stops to the tilting of the cover, the central portion of the rear edge of the cover being depressed and reversely curved to act as a fulcrum against the adjacent surface of the handle when the cover is tilted to an open position beyond the vertical.

2. A receptacle having a body portion with a rearwardly and upwardly sloping handle, a cover therefor having a rear edge which on both sides of the handle extends beyond the top of the body to act as a supporting element when the cover is open, the central portion of the rear edge of the cover being repressed in a reversed curve about the handle and when the cover is open beyond the vertical, acting as a supporting element to support the cover on the handle whereby the handle supports the cover at such central portion and the further movement of the cover is limited by the rear edge engaging the back wall of the body.

MARY S. WRIGHT.

REFERENCES CITED

The following references are of record in the file of this patent:

UNITED STATES PATENTS

| Number | Name | Date |
| --- | --- | --- |
| 163,355 | Boteler | May 18, 1875 |
| 191,771 | Moyer | June 12, 1877 |
| 295,902 | Blumenthal | Apr. 1, 1884 |
| 433,539 | Oetzmann | Aug. 5, 1890 |
| 578,529 | Vogeley | Mar. 9, 1897 |
| 583,777 | Trowbridge | June 1, 1897 |
| 771,138 | Frost | Sept. 27, 1904 |
| 2,094,446 | Clement | Sept. 28, 1937 |

FOREIGN PATENTS

| Number | Country | Date |
| --- | --- | --- |
| 12,385 | Great Britain | Sept. 30, 1886 |
| 3,427 | Great Britain | Feb. 26, 1889 |
| 22,328 | Great Britain | Oct. 10, 1907 |